March 26, 1929.   S. HORELICK   1,706,609

TEMPERATURE INDICATOR

Filed April 5, 1926

Inventor
Samuel Horelick
By his Attorneys
Edwards, Sager & Bower

Patented Mar. 26, 1929.

1,706,609

UNITED STATES PATENT OFFICE.

SAMUEL HORELICK, OF PITTSBURGH, PENNSYLVANIA, ASSIGNOR TO PITTSBURGH TRANSFORMER COMPANY, A CORPORATION OF PENNSYLVANIA.

TEMPERATURE INDICATOR.

Application filed April 5, 1926. Serial No. 99,697.

This invention relates to temperature indicators, and more particularly to apparatus intended to indicate or record temperatures at the interior of operating electrical equipment such as transformers.

It is frequently necessary to explore the interior of transformers and other electrical equipment to determine the presence of "hot spots" therein. For this purpose temperature responsive elements or thermometers are inserted in holes provided in the core of the transformer or in spaces provided between the coils thereof. An exact temperature measurement is required and consequently it is customary to remove the insulation from the conductor forming the coil and thus to place the temperature responsive element in the closest contact therewith.

The thermometers used heretofore have been provided with metallic temperature responsive elements and to avoid short circuits and consequent injury to the equipment or to the operator, these elements have been enclosed in heavy insulation. The insulation retards the flow of heat to the temperature responsive element and consequently prevents the attainment of correct temperature determination.

It is the object of the invention to provide a temperature indicator in which a temperature responsive element of glass or similar non-conducting material which can be placed in direct contact with charged conductors is connected to a suitable indicating or recording apparatus.

A further object of the invention is the provision of a simple and effective temperature indicator which is adapted to show correctly the exact temperature of the surface with which it contacts.

Figure 1:
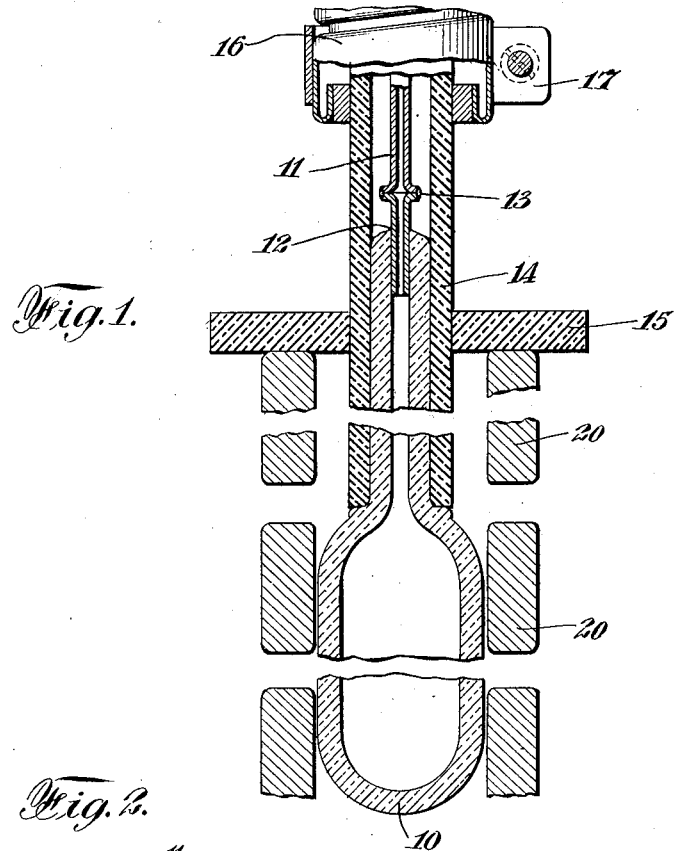
Figure 2:
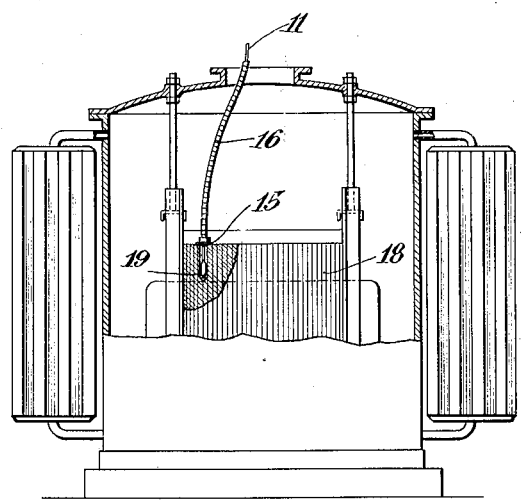
Figure 3:
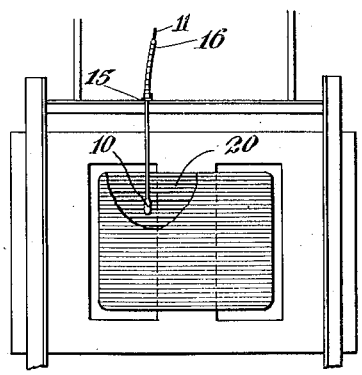

Other objects and advantages of the invention will be apparent by reference to the following specification and accompanying drawings, in which Fig. 1 is an enlarged vertical section of a temperature responsive member embodying the invention;

Fig. 2 is a vertical sectional view showing the invention installed in a transformer, and Fig. 3 is a vertical sectional view of the invention installed in a different section of a transformer.

In carrying out the invention the indicator may be in the form of a thermometer. It is preferably constructed of glass or other insulating material with a non-conducting vapor or liquid therein. The tube of the thermometer is attached to a capillary tube of suitable material which is connected to a grounded instrument such as a recording dial. The connection between the glass tube and the capillary tube is effected by a short tube of platinum or a suitable alloy having a coefficient of expansion close to that of glass. One end of the platinum tube is fused to the glass tube and the other end is held by a welded joint to the capillary tube. A reinforcing fiber or hard rubber fitting encases the glass tube with the platinum tube and has attached thereto an armored cable. The armored cable encases the capillary tube as far as the recording instrument and serves as a protection therefor. An adjustable collar can be mounted upon the fiber fitting to act as an insulator and support when the glass tubing is inserted in places such as holes in a transformer core and between transformer coils.

In the drawings a simple form of indicator is shown by way of illustration. The thermometer 10 of glass or other refractory material is attached to the capillary tubing 11, which tubing is preferably of ductile metal, such as copper. The connection between the glass thermometer 10 and the capillary metal tubing 11 is made through a small tube 12 of platinum or a suitable alloy which has about the same coefficient of expansion as glass so as to prevent breakage of the glass during changes in temperature. One end of the tube 12 is fused to the glass and the opposite end is joined to the capillary tubing 11 by means of a welded joint 13. A fiber or hard rubber fitting 14 encases the glass tubing of the thermometer 10 and the welded joint 13 to protect the glass tubing from breaking. An insulating collar 15 is mounted on the fitting 14 and has free sliding movement thereon. An armored cable 16 is attached to the outer end of the fitting 14 by means of a hose clamp 17. This armored cable serves as a protection for the capillary tubing 11 which encases the same to the recording instrument.

Fig. 2 shows a typical installation of a temperature indicator as applied to the core 18 of a transformer. A hole 19 has been drilled in the core at the "hot spot." The glass thermometer is placed therein. The insulating collar 15 rests on the top surface of the core and the hose clamp 17 rests thereon to gauge the depth to which the thermometer is inserted in the hole, and also to support the weight of the capillary tube 11 and armored cable 16.

Fig. 3 shows a typical installation of the invention as applied to the coils of the transformer. Coils 20 are wound with a separation between them. The thermometer is suspended between the coils. The insulation can be scraped at the "hot spot" so that the bulb of the thermometer can directly contact with the bare conductor as shown in Fig. 1 without fear of injury to the apparatus due to short circuiting of the coils, the glass tubing extending above the coils a sufficient distance so that the armored tubing will be at a safe distance from the live section of the winding.

While the invention is illustrated and described more particularly with reference to transformers, it can be applied to all types and kinds of electrical apparatus, and it can be used for any purpose for which temperature indicators of this type are adapted. Various changes and modifications of the structure to suit the requirements can be made without departing from the invention or sacrificing any of the advantages thereof.

Having described one embodiment of my invention,

I claim:

1. In a temperature indicator for electrical apparatus a thermometer of insulating refractory material, a section of tubing having substantially the same coefficient of expansion as said refractory material embedded in the stem of said thermometer forming an air tight joint and a metal tube secured to the outer end of said tubing.

2. In a temperature indicator of non-conducting refractory material provided with a bulb and a stem, a flexible metal tubing attached to said stem, a rigid re-enforcing and insulating fitting encircling said stem, a portion of which extends beyond the connection between said stem and said tube and a flexible armored cable attached to said fitting and encasing said metal tubing.

3. In a temperature indicator the construction of a temperature responsive element of insulating material and containing an insulating fluid therein which is adapted to respond to temperature changes, a metallic tube forming an extension of the element and connected thereto and an insulating fitting for said metallic tube and a portion only of said temperature responsive element leaving the entire bulb portion of said temperature responsive element exposed.

4. In a temperature indicator the construction of a temperature responsive element of electrical non-conducting material and containing a fluid therein which is adapted to respond to temperature changes, and a metallic tube forming an extension of the element and connected thereto, the connection between the metallic tube and the non-conducting material being made of a metal having a coefficient of expansion substantially the same as that of the non-conducting material.

SAMUEL HORELICK.